United States Patent [19]

Tomita et al.

[11] Patent Number: 4,522,029
[45] Date of Patent: Jun. 11, 1985

[54] CONTROL SYSTEM OF EXHAUST FOR INTERNAL COMBUSTION ENGINE

[75] Inventors: Takao Tomita, Niiza; Masahiro Akiba, Tokyo; Hideki Toyota, Kamifukuoka; Yasuo Terada, Kawagoe, all of Japan

[73] Assignee: Honda Giken Kogyo Kabushiki Kaisha, Tokyo, Japan

[21] Appl. No.: 563,425

[22] Filed: Dec. 20, 1983

[30] Foreign Application Priority Data

Dec. 20, 1982 [JP]  Japan ................................ 57-223414

[51] Int. Cl.³ ............................................. F02B 27/02
[52] U.S. Cl. ........................................ 60/314; 60/312
[58] Field of Search .................................. 60/312, 314

[56] References Cited

U.S. PATENT DOCUMENTS

| | | | |
|---|---|---|---|
| 3,254,484 | 6/1966 | Kopper | 60/312 |
| 3,367,311 | 2/1968 | Tenney | 60/314 |

FOREIGN PATENT DOCUMENTS

| | | | |
|---|---|---|---|
| 1601350 | 11/1970 | Fed. Rep. of Germany | 60/312 |
| 112823 | 9/1980 | Japan | 60/312 |

Primary Examiner—Douglas Hart
Attorney, Agent, or Firm—Pollock, Vande Sande & Priddy

[57] ABSTRACT

Exhaust system control apparatus for internal combustion engine having an exhaust line and a branch line thereon, and an opening and closing valve on said branch line adapted to open when the engine operates at low speed and to close when the engine operates at high speed. The ratio between the cross-sectional areas of the branch line and the exhaust line is about 0.6 to 0.8.

1 Claim, 6 Drawing Figures

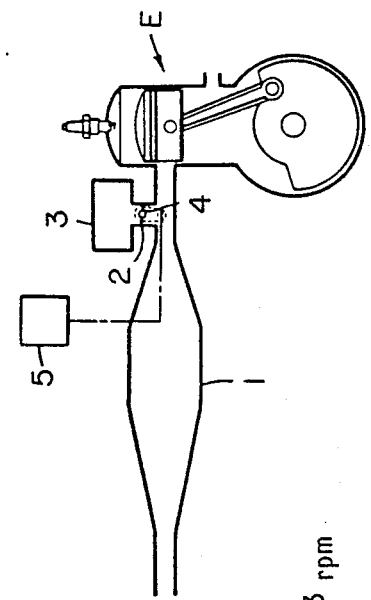
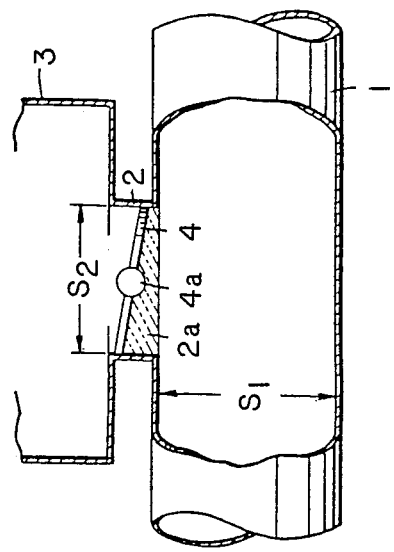
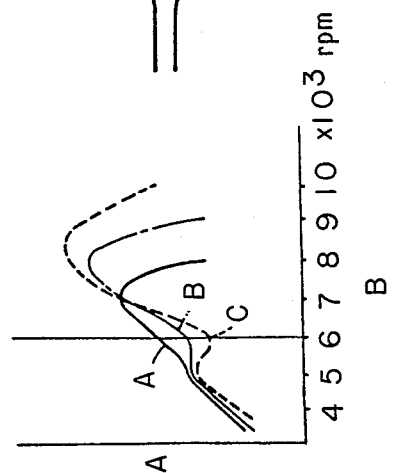
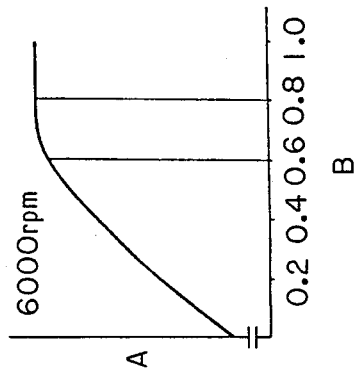
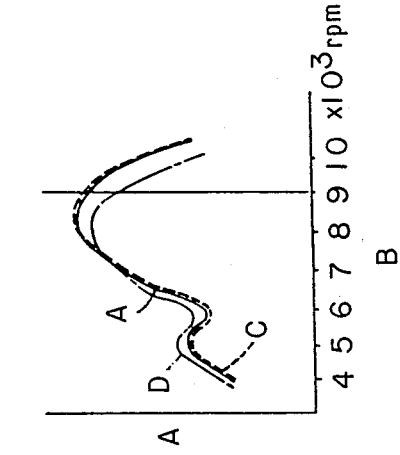
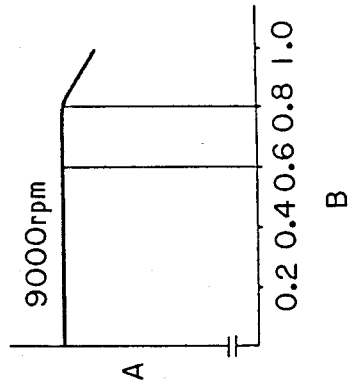

CONTROL SYSTEM OF EXHAUST FOR INTERNAL COMBUSTION ENGINE

SUMMARY OF THE INVENTION

The present invention relates to an internal combustion engine exhaust system control apparatus, in particular, of the type having a branch line connection to a sub-chamber part way along the exhaust line of an internal combustion engine, and including an opening and closing valve on the branch line opening in the low-speed range of the engine and closing in the high-speed range.

BACKGROUND OF THE INVENTION

In this type of exhaust system control apparatus, the sub-chamber is placed into operational mode by releasing the opening and closing valve, and the number of vibrations inherent in the exhaust line is thus reduced. As the exhaust line reaches an expanded state, the pulsation effect in the exhaust line is adjusted to fit the low-speed range operation of the engine, and the sub-chamber is put into non-operation mode by closing the opening and closing valve. The number of vibrations inherent in the exhaust line is increased just as the exhaust line reaches a contracted state and the pulsation effect in the exhaust line is adjusted to fit the high-speed range operation of the engine. Thus, by making use of the pulsation effect over the entire operational range, it is possible to heighten the intake efficiency of the engine and to enhance its performance.

The present inventors carefully analyzed the ratio between the cross-sectional areas of the exhaust line and the branch line in this type of exhaust system control apparatus, i.e., the considerable effect which the branching rate has on engine output performance. It was determined that, if the branching rate is too small, the sub-chamber does not operate effectively on the exhaust line even when the opening and closing valve is opened, due to the line resistance of the branching line, and accordingly, full enhancement of output performance is not obtained in the low-speed range of operation of the engine. By contrast, when the branching rate is too large, even when the opening and closing valve is closed, due to the excessive space in the branching line remaining in relation to the connection with the exhaust line, fluctuations in the inherent number of vibrations in the exhaust line occur, and output performance is lowered in the high-speed range of operation of the engine.

OBJECT OF THE INVENTION

The object of the present invention is an internal combustion engine exhaust system control apparatus which is simple and effective in achieving constant stable high output performance over a broad range, from low-speed to high-speed operation of the engine.

BRIEF DESCRIPTION OF THE DRAWINGS

In order that the invention may be more clearly understood, reference will now be made to the accompanying drawings, in which an embodiment of the invention is shown for purposes of illustration, and in which:

FIG. 1 is a vertical cross-sectional side view of a two-cycle internal combustion engine according to the present invention.

FIG. 2 is a detail view of the key area in FIG. 1.

FIG. 3 is a graph showing engine output characteristics when the opening and closing valve is opened.

FIG. 4 is a graph showing the relation between the branching rate ($\lambda$) and the engine output when the opening and closing valve is opened.

FIG. 5 is a graph of engine output characteristics when the opening and closing valve is closed.

FIG. 6 is a graph showing the relation between the branching rate ($\lambda$) and the engine output when the opening and closing valve is closed.

DESCRIPTION OF A PREFERRED EMBODIMENT

FIG. 1 shows a two-cycle internal combustion engine E having a branch line 2 part way along the exhaust line 1, connecting it with a sub-chamber 3. A butterfly type opening and closing valve 4 is located on branch line 2, for opening and closing the same. A control apparatus 5 is connected to the shaft 4a of the opening and closing valve 4. This control apparatus 5 senses the number of revolutions of the engine E, and in a predetermined low-speed operating range, the opening and closing valve 4 is opened, while in a predetermined high-speed operating range, the opening and closing valve 4 is closed.

As shown in FIG. 2, if the cross-sectional area of the exhaust line 1 is made $S_1$, and the cross-sectional area of branching line 2 is made $S_2$, the ratio between $S_2$ and $S_1$, i.e., the branching rate $\lambda$, is expressed as follows:

$$\lambda = S_2/S_1 = 0.6 \text{ to } 0.8$$

This is a special feature of the present invention.

FIG. 3 shows the output characteristics of the engine when the opening and closing valve is in its open position, where $\lambda=0.7$ (line A), where $\lambda=0.4$ (line B), and where no sub-chamber 3 presence is involved (line C).

In each of the cases involved, the engine used had the same specifications.

As can be seen clearly from FIG. 3, at a time when the number of revolutions of the engine was 6000 rpm, in the cases of B and C relative to A, it was clear that the engine output torque was smaller.

FIG. 4 shows the results obtained when the opening and closing valve 4 is in an opened state, with respect to the relation between $\lambda$ and the engine output at the point in time where the number of engine revolutions is 6000 rpm. In this situation, as $\lambda$ increases, the output torque also increases, but when $\lambda$ is greater than or equal to 0.6, the torque becomes constant. When $\lambda$ is less than 0.6, the output torque is reduced, owing to the fact that sub-chamber 3 does not effectively act upon exhaust line 1, due to line resistance in branch line 2. For the reasons given above, the lower limit of $\lambda$ may be fixed specifically at 0.6.

FIG. 5 shows relative results with respect to the output characteristics of the engine when the opening and closing valve is in its closed state, where $\lambda=0.7$ (line A, where $\lambda=1.0$ (line D), and where no sub-chamber 3 presence is involved (line C). Again, in each of the cases involved, the engine used had the same specifications.

As clearly shown in FIG. 5, where the engine operates at high speed, as the size of $\lambda$ increases, the torque of the engine output goes down. This is due to the fact that the excess space 2a of branch line 2 (the area shown in FIG. 2 by means of dotted lines), which is located between exhaust line 1 and opening and closing valve 4, which is in a closed state, creates a type of sub-chamber effect, and the inherent vibration number of the exhaust line 1 is lowered.

Accordingly, in order to enhance the high speed output performance of the engine at high speed, when the opening and closing valve 4 is closed, the excess space 2a of branch line 2 must be made as small as possible, and toward this end, it is necessary to have a small value for $\lambda$ and to locate valve shaft 4a of valve 4 as close to the inner wall of exhaust line 1 as possible, within the limits imposed by space requirements for the bearings for valve shaft 4a.

FIG. 6 shows the relation between $\lambda$ at the time when the revolutions of the engine are at 9000 rpm and the torque of the engine. It will be noted that when the value of $\lambda$ exceeds 0.8, the output torque goes down. For this reason, the upper limit for $\lambda$ is fixed specifically at 0.8.

In summary, in carrying out the present invention, the ratio $\lambda$ between the cross-sectional area $S_2$ of branch line 2 which connects with sub-chamber 3 and the cross-sectional area $S_1$ of exhaust line 1 is set at 0.6 to 0.8. The line resistance of the branch line at the time when the opening and closing valve on said line is opened has almost no effect at all, enhancing the output performance of the engine at low-speed operation by the effective utilization of the sub-chamber function. When the said valve is closed, it is possible to put into action a predetermined high-speed output performance of the engine by controlling the sub-chamber effect of the excess space of the branch line. The result is stable output performance over a broad range, from low speed to high speed.

What is claimed is:

1. Exhaust system control apparatus for an internal combustion engine having an exhaust line, a sub-chamber, a branch line on said exhaust line connecting the latter to said sub-chamber, and an opening and closing valve located on said branch line, said valve being adapted to open when said engine operates at low speed and to close when said engine operates at high speed, the ratio between the cross-sectional areas of said branch line and said exhaust line being about 0.6 to 0.8.

* * * * *